United States Patent
Ramdoss et al.

(10) Patent No.: US 12,393,766 B2
(45) Date of Patent: Aug. 19, 2025

(54) SYSTEMS AND METHODS FOR EDITING ELECTRONIC DOCUMENTS

(71) Applicant: Xero Limited

(72) Inventors: Ashokkumar Ramdoss, Wellington (NZ); Satya Srinivasa Subrahmanyam Avasarala, Wellington (NZ)

(73) Assignee: XERO Limited (NZ)

( * ) Notice: Subject to any disclaimer, the term of this patent is extended or adjusted under 35 U.S.C. 154(b) by 0 days.

(21) Appl. No.: 17/882,252

(22) PCT Filed: Aug. 20, 2021

(86) PCT No.: PCT/NZ2021/050138
§ 371 (c)(1),
(2) Date: Aug. 5, 2022

(87) PCT Pub. No.: WO2023/003479
PCT Pub. Date: Jan. 26, 2023

(65) Prior Publication Data
US 2024/0211677 A1    Jun. 27, 2024

(30) Foreign Application Priority Data
Jul. 19, 2021    (AU) .................... 2021902217

(51) Int. Cl.
*G06F 40/106*    (2020.01)
*G06F 40/109*    (2020.01)
(Continued)

(52) U.S. Cl.
CPC .......... *G06F 40/106* (2020.01); *G06F 40/109* (2020.01); *G06F 40/123* (2020.01); *G06F 40/166* (2020.01)

(58) Field of Classification Search
CPC .... G06F 40/106; G06F 40/109; G06F 40/166; G06F 40/123; G06F 3/048; G06F 3/0482; G06F 3/04842
See application file for complete search history.

(56) References Cited

U.S. PATENT DOCUMENTS 10,210,142 B1 * 2/2019 Jain ................... G06F 40/134
2006/0075339 A1    4/2006 Tomita et al.
(Continued)

FOREIGN PATENT DOCUMENTS

WO    03003642 A2    1/2003
WO    2017196635 A1    11/2017

OTHER PUBLICATIONS

Cristian Gadea et al., A Microservices Architecture for Collaborative Document Editing Enhanced with Face Recognition, May 1, 2016, IEEE International Symposium on Applied Computational Intelligence and Informatics, pp. 1-6 (Year: 2016).*

(Continued)

*Primary Examiner* — Tam T Tran

(57) ABSTRACT

Embodiments generally relate to a method comprising storing document data corresponding to a document to a memory of a computing device; rendering the document data to cause the document to be displayed within a web portion of a user interface of the computing device; rendering at least one control element within a native portion of the user interface by executing a native editing application; in response to receiving an input via the at least one control element, passing at least one parameter to at least one function stored within the document data to cause a modification of the displayed document; and re-rendering the displayed document within the web portion.

20 Claims, 3 Drawing Sheets

(51) Int. Cl.
*G06F 40/123* (2020.01)
*G06F 40/166* (2020.01)

(56) References Cited

U.S. PATENT DOCUMENTS

| | | | |
|---|---|---|---|
| 2013/0239040 A1* | 9/2013 | Kaleta | G06F 3/0484 |
| | | | 715/772 |
| 2016/0191645 A1* | 6/2016 | Hayton | H04L 67/568 |
| | | | 709/203 |
| 2018/0189250 A1 | 7/2018 | Dropbox | |
| 2020/0117850 A1 | 4/2020 | Amoli et al. | |
| 2022/0382961 A1* | 12/2022 | Schmidtke | G06F 40/197 |

OTHER PUBLICATIONS

Istvan Koren et al., Shared Editing on the Web: A Classification of Developer Support Libraries, Oct. 1, 2013, IEEE International Conference on Collaborative Computing Networking—Applications—Worksharing, pp. 468-477 (Year: 2013).*

International Search Report and Written Opinion as issued in connection with International Patent Application No. PCT/NZ21/50138, mailed Dec. 21, 2021, 15 pages.

Extended European Search Report in European Application No. 21951058.3 mailed Oct. 8, 2024, 8 pages.

\* cited by examiner

SYSTEMS AND METHODS FOR EDITING ELECTRONIC DOCUMENTS

TECHNICAL FIELD

Embodiments generally relate to systems, methods and computer-readable media for editing electronic documents. In particular, some embodiments relate to systems, methods and computer-readable media for editing web-based electronic documents via a native application.

BACKGROUND

Businesses often send various electronic documents to their clients, such as purchase confirmations, invoices, receipts, and reports, for example. These documents may be generated in a web-based environment using a markup language such as HTML, allowing them to be previewed using a web browser. A single document template can then be automatically filled with details relating to each particular customer and their purchase details, and exported to a format for delivery to the customer, such as PDF.

When creating documents to send to their customers, a business owner may wish to change the appearance of a document by adding branding images or changing the fonts used. However, existing methods of allowing for users to edit their electronic documents tend to be difficult to use and inefficient, especially when the user is unfamiliar with the markup language used to generate the document.

It is desired to address or ameliorate one or more shortcomings or disadvantages associated with prior systems for editing electronic documents, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method comprising:
storing document data corresponding to the document to a memory of the computing device;
rendering the document data to cause the document to be displayed within a web portion of a user interface of the computing device;
rendering at least one control element within a native portion of the user interface by executing a native editing application;
in response to receiving an input via the at least one control element, passing at least one parameter to at least one function stored within the document data to cause a modification of the displayed document; and
re-rendering the displayed document within the web portion.

Some embodiments further comprise retrieving the document data from a server system prior to storing the document to the memory.

Some embodiments further comprise storing the at least one parameter as a document setting corresponding to the document data.

According to some embodiments, storing the at least one parameter as a document setting comprises sending the at least one parameter to a server system for storing in a memory location within the server system.

In some embodiments, the document data comprises at least one markup language. In some embodiments, the document data comprises HTML.

According to some embodiments, the at least one function stored within the document data comprises a client-side language function. In some embodiments, the at least one function stored within the document data comprises a JavaScript function.

In some embodiments, the at least one parameter received from the control element is passed to the at least one function by exploiting a hook mechanism exposed in the document data that allows parameters to be passed from the native portion of the user interface to the web portion of the user interface.

In some embodiments, the web portion comprises an embedded web browser rendering engine. According to some embodiments, the web portion comprises a Web View rendering engine.

According to some embodiments, the at least one control element comprises one or more of a virtual button, drop-down box, slider, check box or radio button.

In some embodiments, the at least one parameter relates to at least one of a font colour, font size, font type, or image to be displayed within the document.

Some embodiments relate to a device comprising:
a user interface
a memory storing executable code;
a processor configured to access the memory to execute the executable code;
wherein when executing the executable code, the processor is caused to:
store document data corresponding to the document to the memory;
render the document data to cause the document to be displayed within a web portion of the user interface;
render at least one control element within a native portion of the user interface by executing a native editing application;
in response to receiving an input via the at least one control element, passing at least one parameter to at least one function stored within the document data to cause a modification of the displayed document; and
re-rendering the displayed document within the web portion.

Some embodiments further comprise a communications module configured to retrieve the document data from a server system over a network prior to storing the document to the memory.

In some embodiments, the processor is further caused to store the at least one parameter as a document setting corresponding to the document data. In some embodiments, storing the at least one parameter as a document setting comprises sending the at least one parameter to the server system over a network via the communications module for storing.

According to some embodiments, the document data comprises at least one markup language. In some embodiments, the document data comprises HTML.

In some embodiments, the at least one function stored within the document data comprises a client-side language function. In some embodiments, the at least one function stored within the document data comprises a JavaScript function.

According to some embodiments, the processor is caused to pass the at least one parameter received from the control element to the at least one function by exploiting a hook mechanism exposed in the document data that allows parameters to be passed from the native portion of the user interface to the web portion of the user interface.

According to some embodiments, the web portion comprises an embedded web browser rendering engine. In some embodiments, the web portion comprises a Web View rendering engine.

In some embodiments, the at least one control element comprises one or more of a virtual button, drop-down box, slider, check box or radio button.

In some embodiments, the at least one parameter relates to at least one of a font colour, font size, font type, or image to be displayed within the document.

Some embodiments relate to a computer-readable storage medium storing instructions that, when executed by a processor, cause the processor to perform the method of some other embodiments.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Various ones of the appended drawings merely illustrate example embodiments of the present disclosure and cannot be considered as limiting its scope.

DESCRIPTION OF EMBODIMENTS

Figure 1:
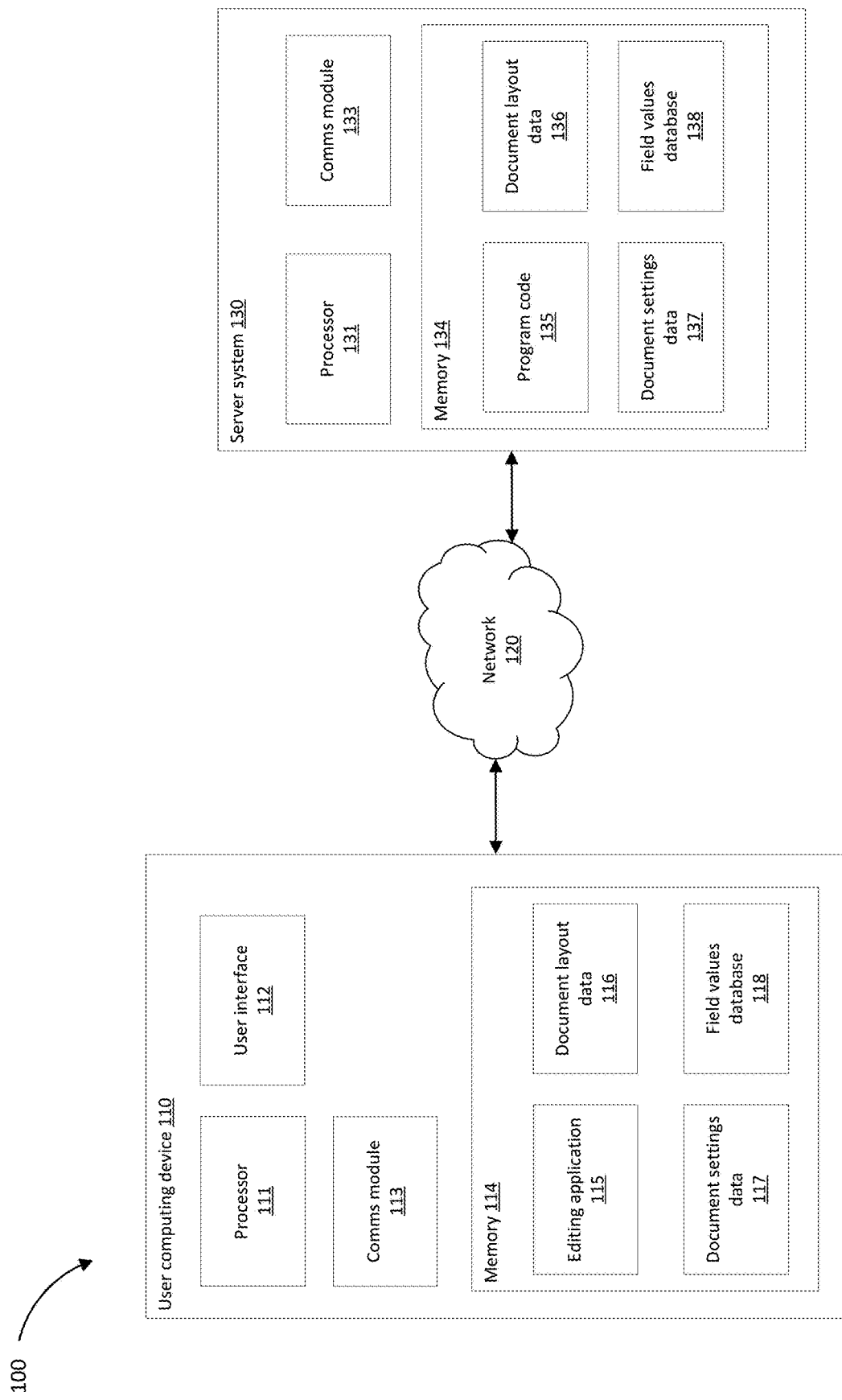
FIG. 1 is a schematic diagram of a system for editing electronic documents, according to some embodiments.

Embodiments generally relate to systems, methods and computer-readable media for editing electronic documents. In particular, some embodiments relate to systems, methods and computer-readable media for editing web-based electronic documents via a native application.

Markup languages are often used to generate documents in cases where a particular document type is to be generated multiple times with variable fields. For example, a business may wish to send invoices to their clients on a monthly basis. While the addressee of the invoice will change between customers, and the invoice amount will change from month to month, it may be desirable to keep other parts of the invoice the same across all generated invoices. For example, the business owner may wish to replicate their branding across all invoice documents, and to provide the same payment details. Using a markup language allows for the static portions of the invoice to be encoded within an electronic document as document layout data, and for the variable fields to be filled in based on data retrieved from a database when the document is rendered for provision to the recipient as a rendered document page.

As markup languages may not be intuitive, web based environments may be used to provide a more user-friendly way of updating the appearance of the documents. Document layout data may be retrieved from a server, rendered and presented as a preview document page in a web based environment, such as within a browser application. Using control elements provided within the web based environment, a user may be able to update the appearance of the preview document page by adding branding to the document or changing fonts, sizes and colours of any text. As the user interacts with the control elements, instructions generated based on their actions are sent to the server hosting the document layout data, which processes the instructions to make the requested change to the document layout data. The browser application then retrieves the updated document layout data and re-renders it to cause an updated preview document page to be displayed.

This method of editing documents causes lag between the time the user requests the change and the time at which the change is displayed, due to the duration of time required to send the instructions to the server and to re-download and re-render the updated document layout data. Furthermore, this method requires a consistent network connection between the user device and the server hosting the document being edited.

The described embodiments relate to an alternative method of editing an electronic document. Described embodiments may reduce the lag between a time at which a change is requested and a time at which the change is displayed. Described embodiments also relate to a method that does not require a network connection to be maintained between a user computing device and a server system while a document is being edited.

This is achieved by providing an application that displays a rendered preview document page within a web portion of a user interface, while control elements for modifying the appearance of the document are displayed in a native portion of the user interface. A hook mechanism is used to allow for communication between the web portion and the native portion. By storing a local copy of the document settings data relating to the document to be edited, changes to the document requested using the native control elements can be applied locally on the user device and displayed to the user instantaneously via the preview document page. When a user is satisfied with the changes and modifications, the updated document settings data can be uploaded to a server system or cloud server.

FIG. 1 is a block diagram of a system 100 for facilitating editing of electronic documents. System 100 may facilitate editing of electronic documents capable of being modified using JavaScript, according to some embodiments. System 100 comprises a user computing device 110 in communication with a server system 130 over a communications network 120.

User computing device 110 comprises a processor 111 in communication with a memory 114. Processor 111 comprises one or more data processors for executing instructions, and may comprise one or more microprocessor based platforms, central processing units (CPUs), application specific instruction set processors (ASIPs), application specific integrated circuits (ASICs), suitable integrated circuits, or other processors capable of fetching and executing instruction code as stored in memory 114. Processor 111 may include an arithmetic logic unit (ALU) for mathematical and/or logical execution of instructions, such as operations performed on data stored in internal registers of processor 111.

Memory 114 may comprise one or more memory storage locations, which may be volatile or non-volatile memory types. For example, memory 114 may comprise one or more of random access memory (RAM), read-only memory (ROM), electrically erasable programmable read-only memory (EEPROM) or flash memory. Memory 114 is configured to store program code accessible by the processor 111. The program code may comprise a plurality of executable program code modules executable by processor 111 to cause processor 111 to perform functions as described in further detail below. For example, memory 114 comprises program code in the form of an editing application 115 executable by processor 111.

Memory 114 may also comprise one or more data files comprising data that is accessible to processor 111 for performing read and write functions. For example, memory 114 may store document layout data 116, document settings data 117, and a field values database 118.

Document layout data 116 may be used to store data associated with an electronic document that is accessible to processor 111 for reading and rendering for display as a rendered document page. According to some embodiments, document layout data 116 may comprise markup language that describes the structure of the document page. For example, document layout data 116 may comprise markup language such as HTML in some embodiments. According to some embodiments, document layout data 116 may comprise executable scripts. For example, document layout data 116 may comprise scripts defining Javascript functions in some embodiments. According to some embodiments, document layout data 116 may comprise scripts defining CSS functions.

Document settings data 117 may be used to store document settings associated with the document data stored in document layout data 116. Specifically, document settings data 117 may store parameter values relating to editable aspects of an electronic document. For example, document settings data 117 may store values corresponding to the specific font colour, font size, font type, or image data to be displayed as a rendered document page by processor 111 when rendering document layout data 116. These values may relate to the whole document, or to sections of the document. In some embodiments, document settings data 117 may additionally or alternatively store visibility and/or position data for elements of the document. According to some embodiments, the executable scripts forming part of document layout data 116 may define characteristics of the electronic document that are able to be edited, and document settings data 117 may store the values that get passed to the scripts in order to cause the rendered document page to be displayed with the selected characteristic.

Field values database 118 may store the specific values that are to be input into the text fields of the electronic document when rendering the document to produce the final rendered document pages. For example, field values database 118 may store an array of customer names and contact details, payment information, invoice data, purchase orders, or other data to be inserted into the electronic documents to be sent out to the end clients or customers.

Processor 111 may be configured to execute editing application 115 to cause processor 111 to facilitate the editing of an electronic document. The data relating to the document to be edited may be stored in document layout data 116, document settings data 117 and field values database 118 by processor 111 when executing editing application 115, as described in further detail below with reference to method 200.

User computing device 110 may also comprise a user interface 112 capable of receiving inputs, such as requests, from one or more users of user computing device 110, and capable of conveying outputs, such as information, to the user. User interface 112 may comprise one or more user interface components, such as one or more of a display device, a touch screen display, a keyboard, a mouse, a camera, a microphone, and buttons, for example.

User computing device 110 may further comprise a communications module 113 configured to facilitate communication between user computing device 110 and one or more external computing devices via one or more networks. Communications module 113 may comprise a combination of network interface hardware and network interface software suitable for establishing, maintaining and facilitating communication over a relevant communication channel. According to some embodiments, communications module 113 may facilitate communication between user computing device 110 and other devices within system 100 via network 120. For example, communications module 113 may facilitate communication between user computing device 110 and server system 130 via network 120.

Network 120 may comprise one or more local area networks or wide area networks that facilitate communication between elements of system 100. For example, according to some embodiments, network 120 may be the internet. However, network 120 may comprise at least a portion of any one or more networks having one or more nodes that transmit, receive, forward, generate, buffer, store, route, switch, process, or a combination thereof, etc. one or more messages, packets, signals, some combination thereof, or so forth. Network 120 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fibre-optic network, or some combination thereof.

Server system 130 may comprise one or more computing devices and/or server devices, such as one or more servers, databases, and/or processing devices in communication over a network. Server system 130 may be configured to host one or more web based documents available for access and editing by user computing device 110.

According to some embodiments, server system 130 may comprise a cloud based server system. Server system 130 comprises a processor 131 in communication with a memory 134. Processor 131 comprises one or more data processors for executing instructions, and may comprise one or more microprocessor based platforms, central processing units (CPUs), application specific instruction set processors (ASIPs), application specific integrated circuits (ASICs), suitable integrated circuits, or other processors capable of fetching and executing instruction code as stored in memory 134. Processor 131 may include an arithmetic logic unit (ALU) for mathematical and/or logical execution of instructions, such as operations performed on the data stored in internal registers of processor 131.

Memory 134 may comprise one or more memory storage locations, which may be volatile or non-volatile memory types. For example, memory 134 may comprise one or more of random access memory (RAM), read-only memory (ROM), electrically erasable programmable read-only memory (EEPROM) or flash memory. Memory 134 is configured to store program code 135 accessible by the processor 131. Program code 135 may comprise a plurality of executable program code modules executable by processor 131 to cause processor 131 to perform functions as described in further detail below.

Memory 134 may also comprise one or more data files comprising data that is accessible to processor 131 for performing read and write functions. For example, memory 134 may store document layout data 136, document settings data 137, and a field values database 138.

Document layout data 136 may be used to store data associated with a web based electronic document that is accessible to processor 131 for reading and rendering for display as a rendered document page. As described above with reference to document layout data 116, document layout data 136 may comprise markup language that describes the structure of the document page. For example, document layout data 136 may comprise markup language such as HTML in some embodiments. According to some embodiments, document layout data 136 may comprise executable scripts. For example, document layout data 136 may comprise scripts defining Javascript functions in some embodiments. According to some embodiments, document layout data 136 may comprise scripts defining CSS functions.

Document settings data 137 may be used to store document settings associated with the document data stored in document layout data 136. As described above with reference to document settings data 117, document settings data 137 may store parameter values relating to editable aspects of an electronic document. For example, document settings data 137 may store values corresponding to the specific font colour, font size, font type, or image data to be displayed as a rendered document when rendering document layout data 136. According to some embodiments, the executable scripts forming part of document layout data 136 may define characteristics of the electronic document that are able to be edited, and document settings data 137 may store the values that get passed to the scripts in order to cause the rendered document page to be displayed with the selected characteristic.

Field values database 138 may store the specific values that are to be input into the text fields of the electronic document when rendering the document to produce the final rendered document pages. As described above with reference to field values database 118, field values database 138 may store an array of customer names and contact details, payment information, invoice data, purchase orders, or other data to be inserted into the electronic documents to be sent out to the end clients or customers.

Processor 131 may be configured to execute program 135 to perform functions such as retrieving one or more of document layout data 136, document settings data 137 and field values database 138 from memory 134, causing communications module 133 to communicate the retrieved document layout data 136, document settings data 137 and/or field values database 138 to user computing device 110 via network 120, receiving updated document settings data from user computing device 110 via network 120, and writing the updated document settings data to memory 134 as document settings data 137.

Server system 130 may further comprise a communications module 133 configured to facilitate communication between user server system 130 and one or more external computing devices via one or more networks. Communications module 133 may comprise a combination of network interface hardware and network interface software suitable for establishing, maintaining and facilitating communication over a relevant communication channel. According to some embodiments, communications module 133 may facilitate communication between server system 130 and other devices within system 100 via network 120. For example, communications module 133 may facilitate communication between server system 130 and user computing device 110 via network 120.

Figure 2:
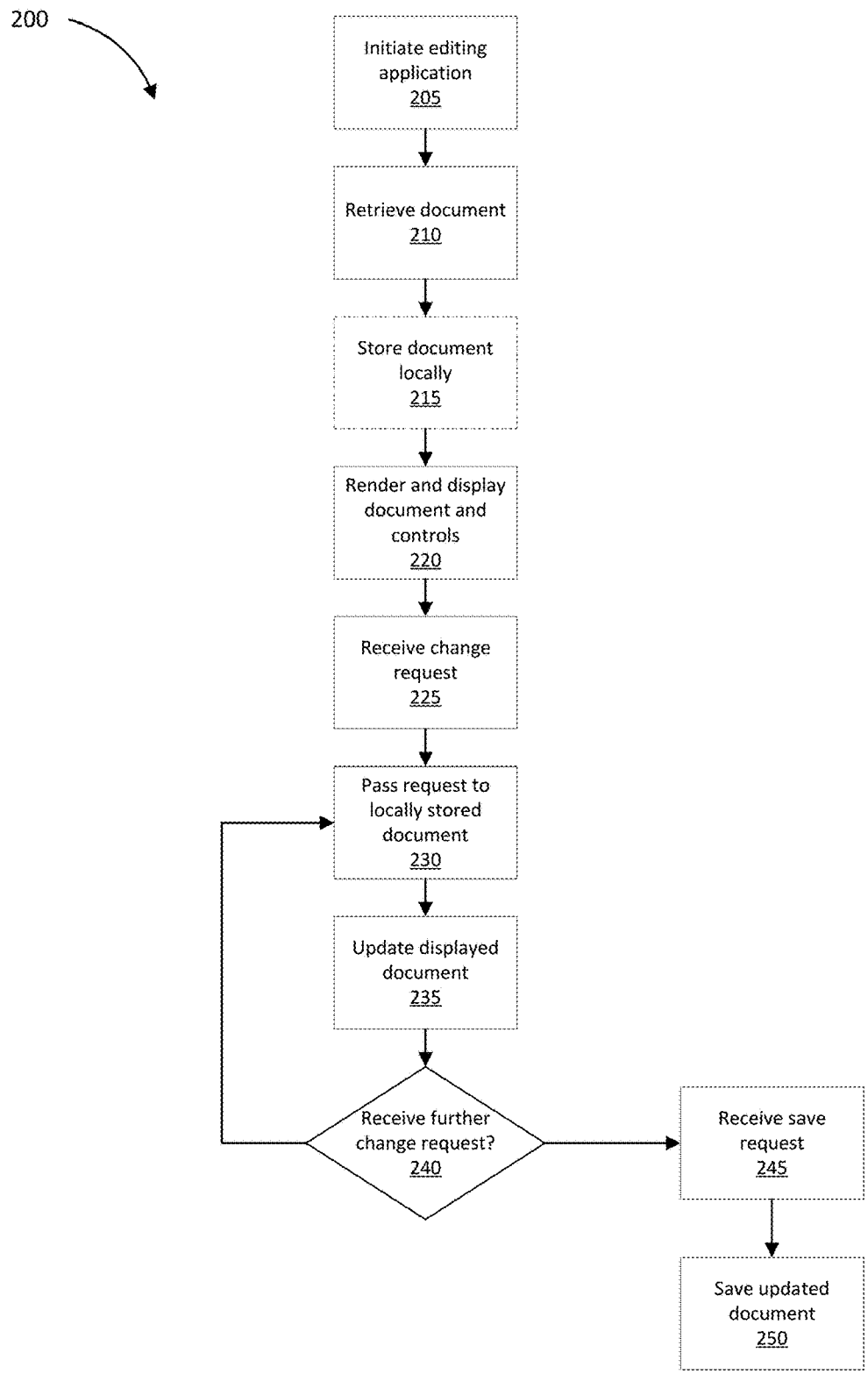
FIG. 2 is a process flow diagram of a method of editing electronic documents, according to some embodiments.

FIG. 2 is a process flow diagram of a method 200 performed by processor 111 of user computing device 110 when caused to execute editing application 115. Processor 111 may be caused to execute editing application 115 in response to a command received from a user of user computing device 110 via user interface 112, such as by a user interacting with a virtual icon representing the editing application 115.

At step 205, processor 111 executing editing application 115 is caused to initiate editing application 115. This may comprise causing user interface 112 to display a graphical user interface representing editing application 115. According to some embodiments, user interface 112 may be caused to display a graphical user interface having a first portion, being a web portion 310 configured to display web based content, and a second portion, being a native portion 320 configured to display native content, as described in further detail below with reference to FIG. 3. Web portion 310 may comprise a web view object that allows for the display of web content within the graphical user interface of editing application 115, such as an embedded web browser rendering engine. Web portion 310 may comprise a WebView rendering engine in some embodiments.

At step 210, processor 111 executing editing application 115 is caused to retrieve an electronic document for editing. According to some embodiments, step 210 may be performed in response to a user interaction with the graphical user interface displayed by user interface 112, such as interacting with a virtual button displayed on user interface 112 to instruct user computing device 110 to open a selected document for editing. In some alternative embodiments, processor 111 may automatically retrieve a default document for editing upon initiating editing application 115.

According to some embodiments, at least some of the document data may be retrieved from server system 130. This may be done by processor 111 sending a message to server system 130 via network 120 and using communications module 113, requesting particular document data that is hosted on server system 130. Communications module 133 of server system 130 may receive the message, which may be interpreted by processor 131. Processor 131 may then be caused to execute program code 135, which may contain instructions that further cause processor 131 to retrieve one or more of document layout data 136, document settings data 137 and field values database 138 from memory 134. Processor 131 may subsequently be caused to communicate the retrieved document layout data 136, document settings data 137 and/or field values database 138 back to user computing device 110 via network 120 and using communications module 133.

According to some alternative embodiments, the required document data may be hosted locally by user computing device 110. In such embodiments, processor 110 may be caused to retrieve document layout data 116, document settings data 117 and field values database 118 from local memory 114, and proceed directly to step 220 of method 200.

Where one or more of document layout data 136, document settings data 137 and field values database 138 has been retrieved from server system 130, processor 111 executing editing application 115 is subsequently caused to perform step 215 to store the document data locally. Processor 111 receives document layout data 136, document settings data 137 and/or field values database 138 via communications module 113, and stores it as local document layout data 116, document settings data 117 and/or field values database 118, respectively.

At step 220, processor 111 executing editing application 115 is then caused to render and display the retrieved and/or stored document layout data 116. According to some embodiments, document layout data 116 may comprise data relating to an electronic document. As described above, document layout data 116 may comprise markup language, such as HTML, defining the structure of the electronic document to be displayed. Document layout data 116 may further comprise executable scripts. In some embodiments, these scripts may be Javascript functions which can be passed particular values to set certain characteristics of the displayed document. For example, document layout data 116 may comprise a "Font Colour" Javascript function, which may receive a "Colour" input value, and cause the font of one or more sections of the document as defined by the markup language to be rendered in a colour associated with the value passed to the function.

Processor 111 uses a web view object defined by editing application 115 to render document layout data 116, and to cause the rendered document page to be displayed in web portion 310. Document layout data 116 may be rendered by processor 111 interpreting the markup language code stored in document layout data 116. For example, where document layout data 116 comprises a HTML document, processor 111 may render the document by using the HTML to construct the data Document Object Model (DOM). Processor 111 uses the DOM to construct a render tree, which is then rendered by the web view object acting as a browser engine.

According to some embodiments, processor 111 may also be configured to execute any scripts and functions stored in document layout data 116, such as CSS and/or JavaScript functions. Where document layout data 116 comprises executable functions that assign values to particular parameters of the document page being rendered, processor 111 may execute those functions with initial default values, which may be stored in document settings data 117. For example, if document layout data 116 comprises a Javascript "Font Colour" function that is passed a value corresponding to a desired colour for a portion of the text to be displayed, processor 111 may execute that function by passing the function a default colour value stored in document settings data 117.

Document layout data 116 includes one or more hooks that allow for communication between web portion 310 and native portion 320 in the form of the executable functions. The hooks may serve as a form of communication contract between the web portion 310 and native portion 320. Where document layout data 116 comprises executable scripts as described above, the particular scripts within document layout data 116 can be accessed by native editing application 115 based on a contract between the editing application 115 and document layout data 116. Editing application 115 can identify which parameters can be passed to the scripts to modify the stored document layout data 116.

Figure 3:
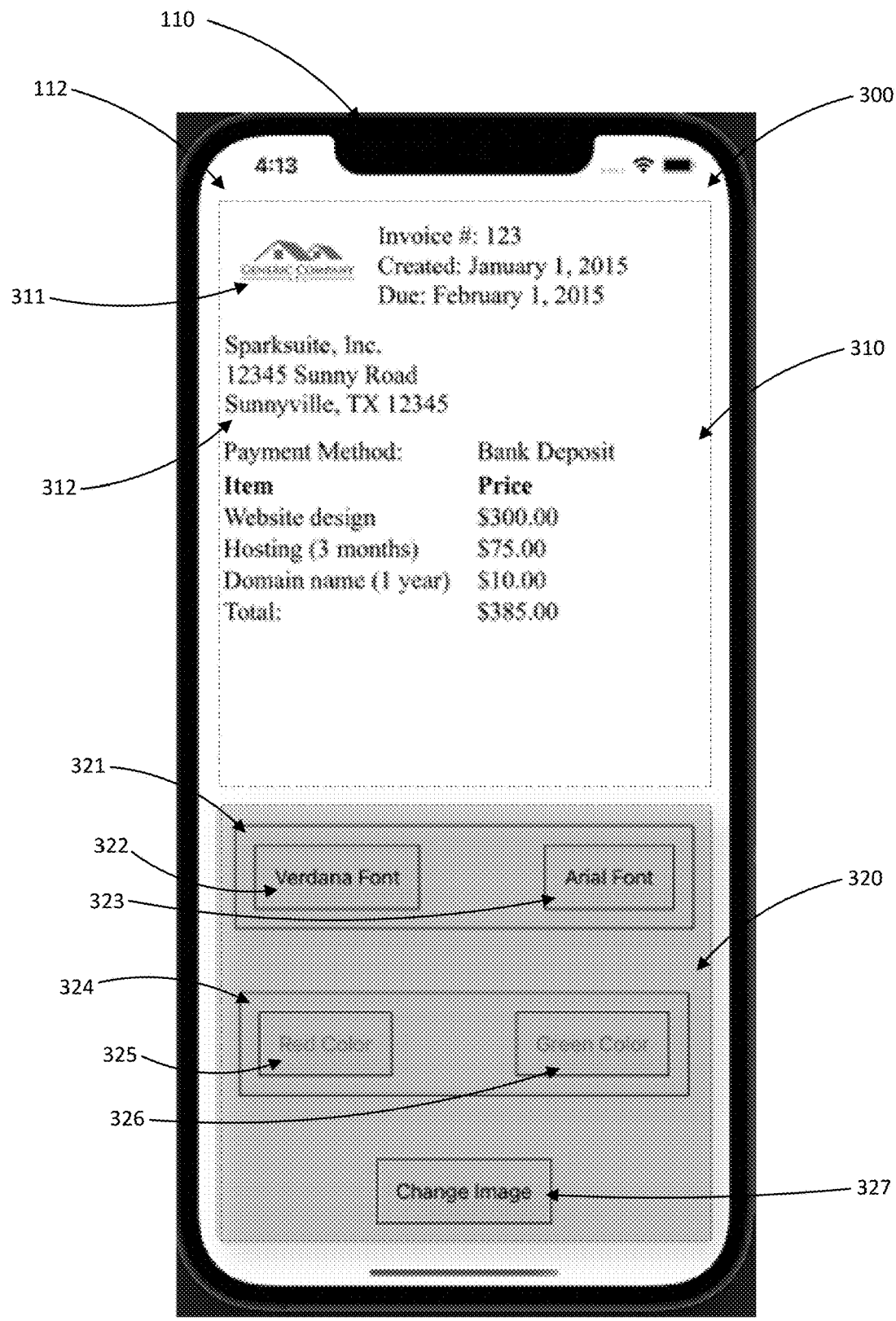
FIG. 3 is an example screenshot as displayed by the user computing device of FIG. 1 when executing an application for editing electronic documents, according to some embodiments.

According to some embodiments, document layout data 116 may also include text fields that may take on various values when the document layout data 116 is processed to produce customer-specific rendered document pages, such as customer name or address fields. In such embodiments, when rendering document layout data 116, processor 111 may select a default value for these fields from values stored in field values database 118, in order to provide an example of the rendered appearance of such document pages. An example of a rendered document page displayed in web portion 310 of a user interface 112 is shown in FIG. 3, and described in further detail below.

Also at step 220, processor 111 executing editing application 115 is further caused to render and display editing control elements in the native portion 320 of the graphical user interface displayed on user interface 112. These may include virtual buttons, drop-down boxes, sliders, check boxes, radio buttons and other graphical control elements that are native to editing application 115. The control elements may allow a user of user computing device 110 to make changes to the document as displayed in web portion 310. Examples of control elements, such as elements 322, 323, 325 and 326, are shown in FIG. 3 and described in further detail below.

At step 225, processor 111 executing editing application 115 receives a change request via user interface 112. The change request may be initiated by a user interacting with a control element displayed in native portion 320 in order to change the appearance of one or more visual elements of the document displayed in web portion 310. Changes to visual appearance may include hiding or revealing sections or elements of the document, and/or altering the position of sections or elements of the document in some embodiments. Changes to visual appearance may additionally or alternatively include changes to one or more of font colour, font size, font type, or image data to be displayed. For example, in some embodiments the change request may arise from a user interacting with a virtual button that is configured to cause a change in the colour of a font of the document displayed in web portion 310. For example, a user may interact with virtual button 325 or 326 as described in further detail below with reference to FIG. 3. Based on the user input received, processor 111 may be configured to determine parameters relating to the requested change, such as the portion of the document the change is to be applied to, the property to be changed, and the new value of the property. For example, the change request may relate to the header portion of the document, to the font type property, and specify that the new value for that property corresponds to the Times New Roman font.

Having received the change request, processor 111 executing editing application 115 may perform step 230 by executing a function within editing application 115 called in response to the received user input. At step 230, processor 111 may execute the function to derive the parameters defining the requested change, and to translate these to the parameter types identified at step 220 as being able to be passed to document layout data 116. Processor 111 then passes the translated parameters to the appropriate function within document layout data 116, to cause the particular function or functions to be evoked by the scripts within document layout data 116. Processor 111 may execute the scripts within document layout data 116 using the parameters passed to the function. Processor 111 may also store the parameters passed to document layout data 116 as updated document settings data 117.

At step 235, having updated the locally stored document settings data 117 based on a change request, processor 111 executing editing application 115 displays the updated document in web portion 310. As described above with reference to step 220, this involves processor 111 using a web view object defined by editing application 115 to render the document layout data 116 using the updated document settings data 117, and to cause the rendered document to be displayed in web portion 310.

At step 240, processor 111 executing editing application 115 may receive a further change request in response to a user interacting with a different or the same control element of native portion 320. If processor 111 receives such a request, processor 111 may continue executing method 200 from step 230.

Alternatively, processor 111 executing editing application 115 may receive a save request at step 245. A save request may be generated periodically by user computing device 110, or may be generated in response to an input received from a user via user interface 112. For example, a save request may be generated in response to a user interacting with a virtual 'save' button displayed on user interface 112.

In response to receiving the save request, at step 250 processor 111 executing editing application 115 is caused to save the updated document settings data 117. According to some embodiments, document settings data 117 may be saved by being copied to a second memory location within memory 114. According to some alternative embodiments, document settings data 117 may be saved by being sent to server system 130 via network 120 and using communications module 113. Upon receiving the updated document data, processor 131 of server system 130 executing program code 135 may be caused to store the updated document data as document settings data 137.

The previously stored document settings data may be overwritten by the updated data, or the updated data may be stored alongside the previously stored document settings data.

FIG. 3 is an example screenshot showing a graphical user interface 300 displayed on user interface 112 of user computing device 110 executing editing application 115.

Graphical user interface 300 comprises a first portion, being a web portion 310 configured to display web based content, and a second portion, being a native portion 320 configured to display native content. Web portion 310 may comprise a web view object that allows for the display of web based content within the graphical user interface as rendered by processor 111 executing editing application 115 and passed to web portion 310 for display. For example, web portion 310 may comprise a Web View embedded web browser rendering engine in some embodiments. Web portion 310 may be configured to display an electronic document written in one or more client-side languages, such as HTML, JavaScript and/or CSS, for example. Electronic documents are displayed in web portion 310 by processor 111 rendering the markup language and executing the scripts stored in the documents, which causes the visual elements as described in the markup language and scripts to be displayed. In the illustrated embodiment, web portion 310 is displaying an invoice document page comprising a logo 311 as well as text 312. The appearance and configuration of the displayed content is governed by the scripts contained within the electronic document as retrieved by processor 111.

Native portion 320 displays native control elements. The native control elements are rendered and displayed by processor 111 executing editing application 115, which contains code describing the control elements to be displayed. When a user interacts with a control element, processor 111 executing editing application 115 may be caused to pass parameters relating to the change request to document layout data 116 and to update the document displayed in web portion 310 and the data stored in document settings data 117, as described above with reference to steps 230 and 235 of method 200.

In the illustrated embodiment, the displayed control elements include font type controls 321, and font colour controls 324. The illustrated font type controls 321 include a Verdana font virtual button 322, and an Arial font virtual button 323. A user interacting with Verdana font virtual button 322 may cause processor 111 executing editing application 115 to pass at least one parameter to a "Font Style" function within document layout data 116, where the parameter corresponds to Verdana font. Processor 111 may be caused to execute a script stored in document layout data 116, wherein executing the script causes a font type of at least a portion of the text to be displayed by execution of document layout data 116 to be changed to Verdana font. A user interacting with Arial font virtual button 323 may cause processor 111 executing editing application 115 to pass at least one parameter to a "Font Style" function within document layout data 116, where the parameter corresponds to Arial font. Processor 111 may be caused to execute a script stored in document layout data 116, wherein executing the script causes a font type of at least a portion of the text to be displayed by execution of document layout data 116 to be changed to Arial font.

The illustrated font colour controls 324 include a red colour virtual button 325, and a green colour virtual button 326. A user interacting with red colour virtual button 325 may cause processor 111 executing editing application 115 to pass at least one parameter to a "Font Colour" function within document layout data 116, where the parameter corresponds to the colour red. Processor 111 may be caused to execute a script stored in document layout data 116, wherein executing the script causes a font colour of at least a portion of the text to be displayed by execution of document layout data 116 to be changed to red. A user interacting with green colour virtual button 326 may cause processor 111 executing editing application 115 to pass at least one parameter to a "Font Colour" function within document layout data 116, where the parameter corresponds to the colour green. Processor 111 may be caused to execute a script stored in document layout data 116, wherein executing the script causes a font colour of at least a portion of the text to be displayed by execution of document layout data 116 to be changed to green.

Of course, the displayed control elements 322, 323, 325 and 326 are only a limited example of possible control elements that may be displayed in native portion 320. The control elements may include any graphical control elements that allow a user to modify the appearance of a document displayed in web portion 310, including modifying the appearance of text; adding, moving or removing text; modifying the appearance of images; adding, moving or removing images; or any other visual modifications.

Native portion 320 also includes a change image virtual button 327. When a user interacts with change image virtual button 327, processor 111 executing editing application 115 may be caused to ask the user to select an image to be added to the displayed document as logo 311. Once the user has selected an image to be displayed, processor 111 may be caused to pass at least one parameter to a "Change Image" function within document layout data 116, where the parameter corresponds to a URI pointing to the image selected by the user. Processor 111 may be caused to execute a script stored in document layout data 116, wherein executing the script causes the selected image to be displayed as logo 311.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method comprising:
   storing document data corresponding to a document to a memory of a computing device;
   rendering the document data to cause the document to be displayed within a web portion of a user interface of the computing device, wherein the web portion comprises an embedded web browser rendering engine;
   rendering at least one control element within a native portion of the user interface by executing a native editing application;
   in response to receiving an input via the at least one control element, passing at least one parameter to at least one function stored within the document data to cause a modification of the displayed document; and
   using the embedded web browser rendering engine to re-render the displayed document within the web portion.

2. The method of claim 1, further comprising retrieving the document data from a server system prior to storing the document to the memory.

3. The method of claim 1, further comprising storing the at least one parameter as a document setting corresponding to the document data.

4. The method of claim 3, wherein storing the at least one parameter as a document setting comprises sending the at least one parameter to a server system for storing in a memory location within the server system.

5. The method of claim 1, wherein the document data comprises at least one markup language.

6. The method of claim 1, wherein the at least one function stored within the document data comprises a client-side language function.

7. The method of claim 1, wherein the at least one parameter received from the control element is passed to the at least one function by exploiting a hook mechanism exposed in the document data that allows parameters to be passed from the native portion of the user interface to the web portion of the user interface.

8. The method of claim 1, wherein the web portion comprises an embedded web browser rendering engine.

9. The method of claim 1, wherein the at least one control element comprises one or more of a virtual button, drop-down box, slider, check box or radio button.

10. The method of claim 1, wherein the at least one parameter relates to at least one of a font colour, font size, font type, or image to be displayed within the document.

11. A device comprising:
   a user interface;
   a memory storing executable code; and
   a processor configured to access the memory to execute the executable code;
   wherein when executing the executable code, the processor is caused to:
   store document data corresponding to the document to the memory;
   render the document data to cause the document to be displayed within a web portion of the user interface, wherein the web portion comprises an embedded web browser rendering engine;
   render at least one control element within a native portion of the user interface by executing a native editing application;
   in response to receiving an input via the at least one control element, pass at least one parameter to at least one function stored within the document data to cause a modification of the displayed document; and
   using the embedded web browser rendering engine to re-render the displayed document within the web portion.

12. The device of claim 11, further comprising a communications module configured to retrieve the document data from a server system over a network prior to storing the document to the memory.

13. The device of claim 11, wherein the processor is further caused to store the at least one parameter as a document setting corresponding to the document data.

14. The device of claim 11, wherein the processor is further caused to store the at least one parameter as a document setting corresponding to the document data and wherein storing the at least one parameter as a document setting comprises sending the at least one parameter to the server system over a network via the communications module for storing.

15. The device of claim 11, wherein the document data comprises at least one markup language.

16. The device of claim 11, wherein the at least one function stored within the document data comprises a client-side language function.

17. The device of claim 11, wherein the processor is caused to pass the at least one parameter received from the control element to the at least one function by exploiting a hook mechanism exposed in the document data that allows parameters to be passed from the native portion of the user interface to the web portion of the user interface.

18. The device of claim 11, wherein the web portion comprises an embedded web browser rendering engine.

19. The device of claim 11, wherein the at least one parameter relates to at least one of a font colour, font size, font type, or image to be displayed within the document.

20. A non-transient computer-readable storage medium storing instructions that, when executed by a processor, cause the processor to perform a method comprising the steps of:
   storing document data corresponding to a document to a memory of a computing device;
   rendering the document data to cause the document to be displayed within a web portion of a user interface of the computing device, wherein the web portion comprises an embedded web browser rendering engine;
   rendering at least one control element within a native portion of the user interface by executing a native editing application;
   in response to receiving an input via the at least one control element, passing at least one parameter to at least one function stored within the document data to cause a modification of the displayed document; and
   using the embedded web browser rendering engine to re-render the displayed document within the web portion.

* * * * *